United States Patent
Liang et al.

(10) Patent No.: US 12,158,846 B2
(45) Date of Patent: Dec. 3, 2024

(54) INSTANCE DEPLOYMENT METHOD, INSTANCE MANAGEMENT NODE, COMPUTING NODE, AND COMPUTING DEVICE

(71) Applicant: Huawei Cloud Computing Technologies Co., Ltd., Guizhou (CN)

(72) Inventors: Biao Liang, Hangzhou (CN); Xian Chen, Gui'an (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 0 days.

(21) Appl. No.: 17/854,699

(22) Filed: Jun. 30, 2022

(65) Prior Publication Data

US 2022/0365877 A1 Nov. 17, 2022

Related U.S. Application Data

(63) Continuation of application No. PCT/CN2020/116330, filed on Sep. 19, 2020.

(30) Foreign Application Priority Data

Dec. 31, 2019 (CN) .......................... 201911418980.6

(51) Int. Cl.
*G06F 12/0842* (2016.01)

(52) U.S. Cl.
CPC .. *G06F 12/0842* (2013.01); *G06F 2212/6012* (2013.01)

(58) Field of Classification Search
CPC ..................... G06F 12/0842; G06F 2212/6012
See application file for complete search history.

(56) References Cited

U.S. PATENT DOCUMENTS

| | | | |
|---|---|---|---|
| 9,880,933 B1* | 1/2018 | Gupta | G06F 3/0656 |
| 2008/0209434 A1 | 8/2008 | Queck et al. | |
| 2009/0089514 A1* | 4/2009 | Srivastava | G06F 13/4234 711/E12.001 |

(Continued)

FOREIGN PATENT DOCUMENTS

| | | |
|---|---|---|
| CN | 101256516 A | 9/2008 |
| CN | 104283950 A | 1/2015 |

(Continued)

OTHER PUBLICATIONS

Xie Lijun et al.,"Research on QoS-Oriented Proactive Virtual Network Functions Dynamic Placement Strategy", Journal of Information Engineering University, vol. 19, No. 4, Aug. 2018, with an English abstract, 7 pages.

(Continued)

*Primary Examiner* — Gurtej Bansal
(74) *Attorney, Agent, or Firm* — Conley Rose, P.C.

(57) ABSTRACT

In a method, an instance management node receives a request for creating a service instance; the instance management node obtains a cache configuration corresponding to the service instance; and the instance management node creates the service instance on a computing node, and creates a cache instance on the computing node based on the cache configuration. In this way, the service instance may provide a service by using the matched cache instance.

13 Claims, 5 Drawing Sheets

(56) References Cited

U.S. PATENT DOCUMENTS

| | | | |
|---|---|---|---|
| 2011/0314534 A1* | 12/2011 | James | G06F 21/53 |
| | | | 726/9 |
| 2012/0221768 A1 | 8/2012 | Bagal et al. | |
| 2013/0290399 A1 | 10/2013 | Gordon | |
| 2014/0149537 A1 | 5/2014 | Shankaran et al. | |
| 2014/0344391 A1 | 11/2014 | Varney et al. | |
| 2016/0179682 A1* | 6/2016 | Moretti | G06F 12/0875 |
| | | | 718/104 |
| 2016/0179840 A1 | 6/2016 | Dani | |
| 2017/0288983 A1 | 10/2017 | Li | |
| 2018/0048522 A1 | 2/2018 | Pan et al. | |
| 2018/0300242 A1* | 10/2018 | Liu | G06F 16/00 |
| 2019/0095107 A1* | 3/2019 | Wysoczanski | G06F 16/353 |
| 2019/0205174 A1* | 7/2019 | Phelan | G06F 12/084 |
| 2019/0245758 A1 | 8/2019 | Li | |

FOREIGN PATENT DOCUMENTS

| | | |
|---|---|---|
| CN | 107046563 A | 8/2017 |
| CN | 107105500 A | 8/2017 |
| CN | 107391156 A | 11/2017 |
| CN | 107959582 A | 4/2018 |
| CN | 108108310 A | 6/2018 |
| CN | 108768715 A | 11/2018 |
| CN | 109144486 A | 1/2019 |
| CN | 109561024 A | 4/2019 |
| CN | 110032571 A | 7/2019 |
| CN | 110474960 A | 11/2019 |
| CN | 110569102 A | 12/2019 |
| JP | 2014506367 A | 3/2014 |
| WO | 2015070236 A1 | 5/2015 |

OTHER PUBLICATIONS

Lu You et al., "Research and Implementation of Elastic Cloud-Base Buffer Management System for Multi-user Environment", Journal of Nanjing University of Aeronautics and Astronautics, vol. 49, No. 6, Dec. 2017, with an English abstract, 9 pages.

Brendan Burns, "Chapter 5 Replicated Load-Balanced Services, Designing Distributed Systems: Patterns and Paradigms for Scalable, Reliable Services," 1st edition, Japan, O'Reilly Japan, Inc., Apr. 19, 2019, with an English abstract, 22 pages.

\* cited by examiner

INSTANCE DEPLOYMENT METHOD, INSTANCE MANAGEMENT NODE, COMPUTING NODE, AND COMPUTING DEVICE

CROSS-REFERENCE TO RELATED APPLICATIONS

This is a continuation of Int'l Patent App. No. PCT/CN2020/116330 filed on Sep. 19, 2020, which claims priority to Chinese Patent App. No. 201911418980.6 filed on Dec. 31, 2019, both of which are incorporated by reference.

FIELD

This disclosure relates to the database field, and in particular, to an instance deployment method, an instance management node, a computing node, a computing device, a computer-readable storage medium, and a computer program product.

BACKGROUND

As shown in FIG. 1, a cache instance 11 is manually created on a computing node 11 in advance. Subsequently, a tenant may specify to create a service container 12 on the computing node 11 by using a container management node.

SUMMARY

In view of this, this disclosure provides an instance deployment method, an instance management node, a computing node, a computing device, a computer-readable storage medium, and a computer program product, to automatically deploy a cache instance and a service instance through matching.

According to a first aspect, an instance deployment method is provided. In the instance deployment method, an instance management node receives a request for creating a service instance. The instance management node obtains a cache configuration corresponding to the service instance. For example, the cache configuration corresponding to the service instance may be a cache configuration that matches the service instance. The instance management node creates the service instance on a computing node, and creates a cache instance on the computing node based on the cache configuration. In this way, the service instance may provide a service by using the matched cache instance. This improves efficiency of providing a service by the service instance, and improves service performance.

In a possible design of the first aspect, in the method, the cache configuration includes at least one of the following configurations: a cache size; a cache medium; a cache write policy; and a cache algorithm.

In a possible design of the first aspect, in the method, the cache configuration is carried in the request for creating the service instance. For example, a tenant or a user of a tenant may specify, by using the request, the cache configuration that matches the service instance.

In this way, the instance management node obtains the cache configuration from the request, and may create, based on the cache configuration, the cache instance that is manually customized for the service instance.

In a possible design of the first aspect, in the method, the instance management node obtains the stored cache configuration based on the service instance. In this way, when creating the service instance, the instance management node may automatically obtain the cache configuration that matches the service instance, to create the cache instance that matches the service instance. This improves efficiency of providing a service by the service instance, and improves service performance.

In a possible design of the first aspect, in the method, the instance management node selects one computing node that meets the service instance and the cache instance from a plurality of computing nodes.

In this way, the instance management node selects a computing node that has sufficient resources and whose configuration meets the cache configuration from the plurality of computing nodes. This can avoid a creation failure caused by directly creating the service instance and the cache instance on a computing node that has insufficient resources or whose configuration does not meet the cache configuration.

In a possible design of the first aspect, in the method, the instance management node receives a request for creating another service instance. The instance management node obtains a cache configuration corresponding to the another service instance. For example, the cache configuration corresponding to the another service instance may be a cache configuration that matches the another service instance. The instance management node creates the another service instance on the computing node, and creates a cache instance on the computing node based on the cache configuration corresponding to the another service instance. In this way, the another service instance may provide a service by using the matched cache instance. Therefore, two types of cache instances having different cache configurations may be provided on a same computing node, and different services are provided by running different service instances based on the cache instances having different cache configurations. This increases computing node resource utilization, and also provides a manner of deploying heterogeneous service instances.

In a possible design of the first aspect, in the method, cache instances having different cache configurations are dedicated to different service instances, that is, a cache instance is customized for a service instance.

In this way, the service instance may provide a service by using the customized cache instance.

In a possible design of the first aspect, in the method, the computing node receives a request sent by the instance management node. The request carries the cache configuration.

The computing node creates the service instance specified in the request, and creates, based on the cache configuration, the cache instance specified in the request. The cache instance is used by the service instance.

According to a second aspect, an instance management node includes one or more function modules configured to implement the steps implemented by the instance management node in the method according to any one of the first aspect and the possible designs of the first aspect.

A computing node includes one or more function modules configured to implement the steps implemented by the computing node in the method according to any one of the first aspect and the possible designs of the first aspect.

According to a third aspect, a computing device includes a processor and a memory. The memory stores computer instructions. The processor executes the computer instructions stored in the memory, so that the computing device performs the steps implemented by the instance management node in the method according to any one of the first aspect and the possible designs of the first aspect, or the computing device implements the instance management node according to the second aspect. Alternatively, the processor executes the computer instructions stored in the memory, so that the computing device performs the steps implemented by the computing node in the method according to any one of the first aspect and the possible designs of the first aspect, or the computing device implements the computing node according to the second aspect.

According to a fourth aspect, a computer-readable storage medium stores computer instructions. When a processor in a computing device executes the computer instructions, the computing device performs the steps implemented by the instance management node in the method according to any one of the first aspect and the possible designs of the first aspect, or the computing device implements the instance management node according to the second aspect. Alternatively, when a processor in a computing device executes the computer instructions, the computing device performs the steps implemented by the computing node in the method according to any one of the first aspect and the possible designs of the first aspect, or the computing device implements the computing node according to the second aspect.

According to a fifth aspect, a computer program product includes computer instructions, and the computer instructions are stored in a computer-readable storage medium. A processor in a computing device may read the computer instructions from the computer-readable storage medium. The processor executes the computer instructions, so that the computing device performs the steps implemented by the instance management node in the method according to any one of the first aspect and the possible designs of the first aspect, or the computing device implements the instance management node according to the second aspect. Alternatively, the processor executes the computer instructions, so that the computing device performs the steps implemented by the computing node in the method according to any one of the first aspect and the possible designs of the first aspect, or the computing device implements the computing node according to the second aspect.

DETAILED DESCRIPTION

The following describes technical solutions with reference to the accompanying drawings.

A cache instance is created based on a cache configuration, so that the cache configuration can be adjusted to customize the cache instance for a service instance.

The cache configuration includes at least one of the following configurations: a cache size; a cache medium; a cache write policy; and a cache algorithm.

For example, the cache size is used to specify a size of cache space that can be provided by the cache instance for the service instance; or the cache size is used to specify a size of cache space of the cache instance.

For example, the cache medium may be a solid-state drive (SSD), a static random-access memory (SRAM), a flash, or another storage medium; or the cache medium may be a storage area network (SAN), a network attached storage (NAS), or another storage manner.

For example, the cache write policy may be write through (WT), or may be write back (WB), or may be another write manner for writing data to a cache.

For example, the cache algorithm may be a least frequently used (LFU) eviction algorithm, a least recently used (LRU) eviction algorithm, an adaptive replacement cache (ARC) algorithm, or another cache eviction algorithm; or the cache algorithm may be a no replacement cache (NO REP) policy.

Therefore, if two cache configurations have different cache sizes, the two cache configurations are different; if two cache configurations have different cache media, the two cache configurations are different; if two cache configurations have different cache write policies, the two cache configurations are different; if two cache configurations have different cache algorithms, the two cache configurations are different.

Figure 1:
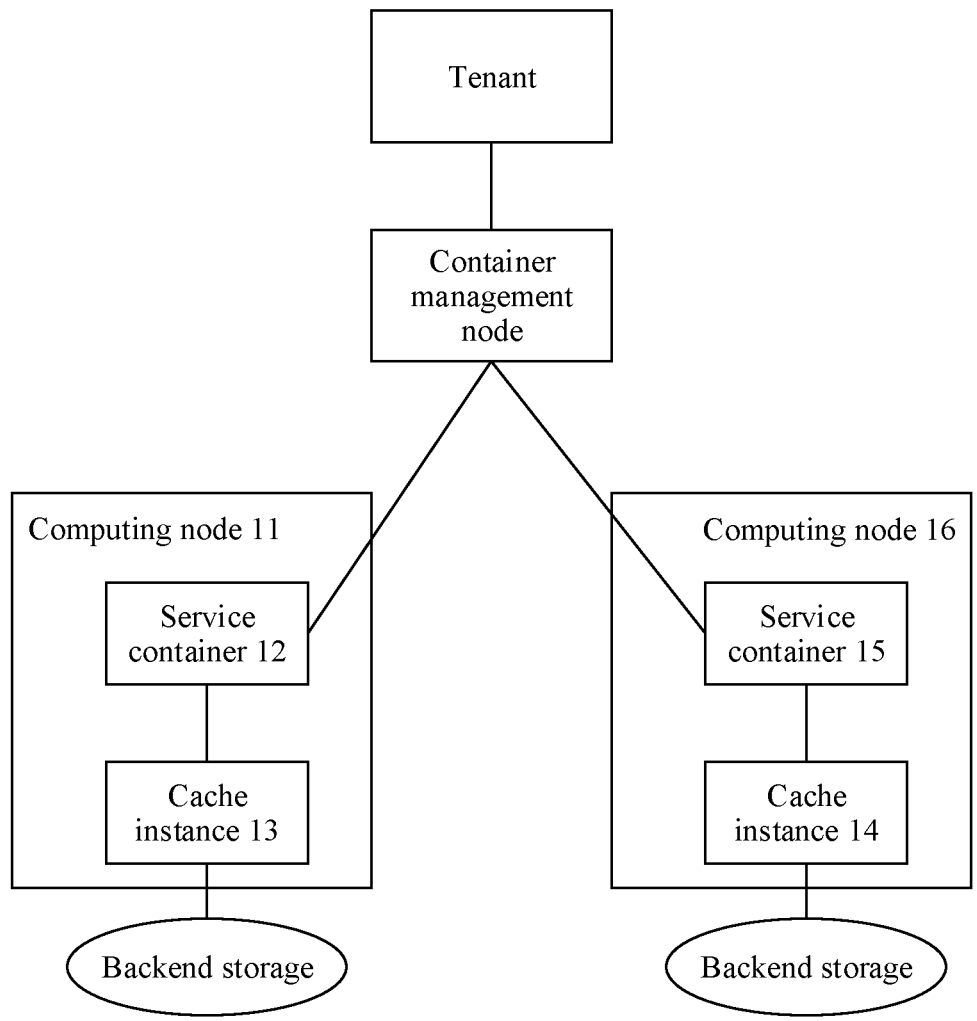
FIG. 1 is a schematic diagram of cache instance deployment.
Figure 2:
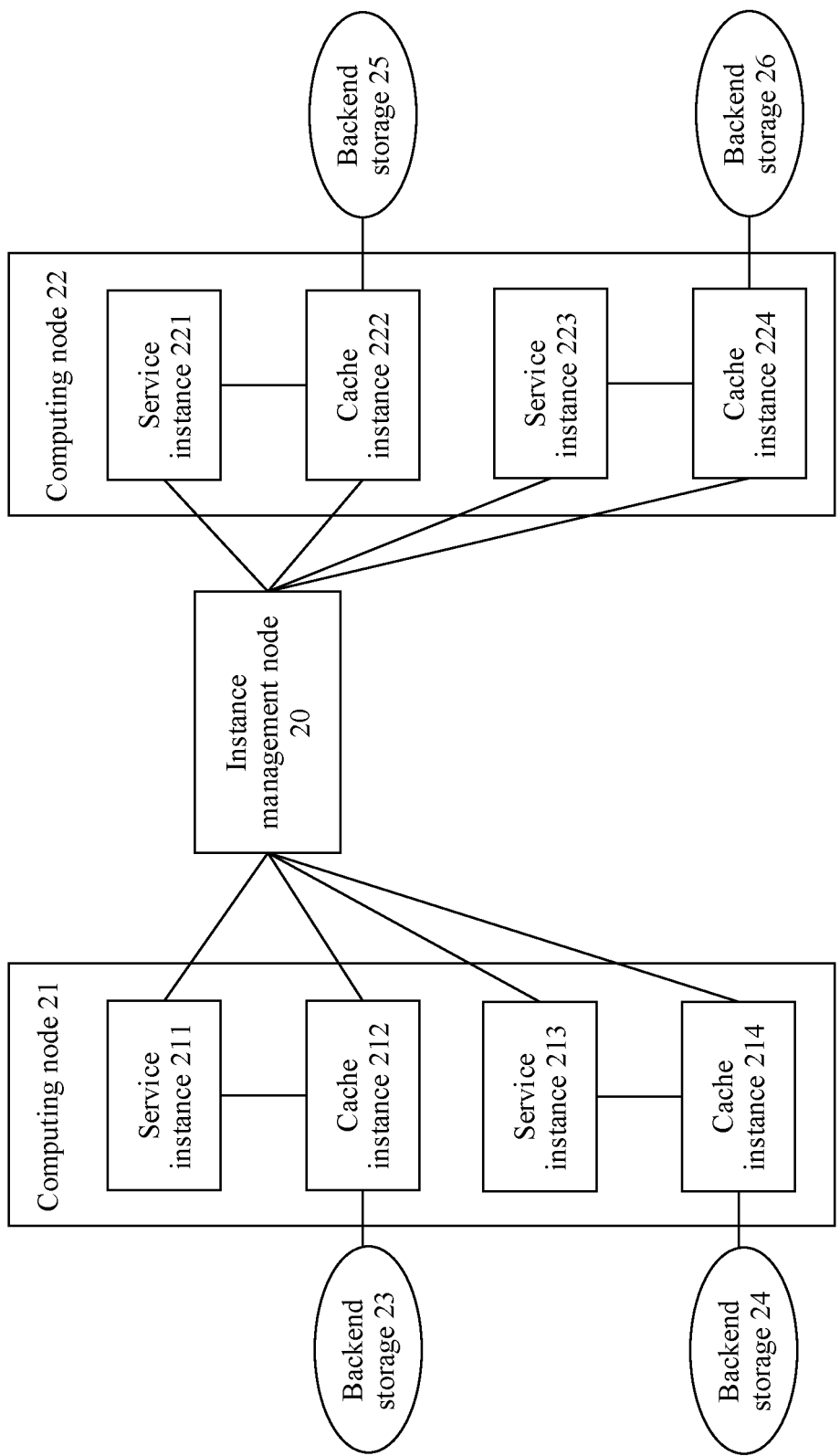
FIG. 2 is a schematic diagram of a scenario to which this disclosure is applicable.

FIG. 2 is a diagram of an architecture of instance deployment.

As shown in FIG. 2, an instance management node 20 may manage service instances and cache instances on a plurality of computing nodes (for example, a computing node 21 and a computing node 22).

For example, the instance management node 20 may deploy, on the computing node 21, a service instance 211 and a cache instance 212 used by the service instance 211, where a cache configuration of the cache instance 212 is set based on a service run by the service instance 211; and the instance management node 20 may deploy, on the computing node 21, a service instance 213 and a cache instance 214 used by the service instance 213, where a cache configuration of the cache instance 214 is set based on a service run by the service instance 213. If the service instance 211 and the service instance 213 run different services, the cache instance 212 and the cache instance 214 may have different cache configurations. In this way, cache instances having different cache configurations may be provided to cooperate with service instances running different services. This improves efficiency of providing a service or improves service performance.

For example, if a service has a priority, a service instance running a high-priority service may be deployed on a high-performance computing node. For example, performance of the computing node 21 is higher than performance of the computing node 22, both the service instance 211 and the service instance 213 provide high-priority services, and the service instance 211 and the service instance 213 are deployed on the computing node 21; both a service instance 221 and a service instance 223 provide low-priority services, and the service instance 221 and the service instance 223 are deployed on the computing node 22.

A cache instance is used to cache data stored in a backend storage; and a service instance uses the data cached by the cache instance, that is, uses the data stored in the backend storage. For example, as shown in FIG. 2, data required by the service instance 211 is stored in a backend storage 23, the cache instance 212 obtains the data required by the service instance 211 from the backend storage 23 and caches the data, and the service instance 211 uses the data cached by the cache instance 212. This can increase a speed of obtaining data by the service instance 211.

Optionally, as shown in FIG. 2, the backend storage 23, a backend storage 24, a backend storage 25, and a backend storage 26 may be different or may be the same. At least two of the backend storage 23, the backend storage 24, the backend storage 25, and the backend storage 26 may be the same.

Optionally, as shown in FIG. 2, the service instance 211 and the service instance 213 are different service instances running a same service. Therefore, the cache instance 212 and the cache instance 214 may have a same cache configuration.

Optionally, the service instance 211 and the service instance 213 are different service instances running a same service. Therefore, the cache instance 212 and the cache instance 214 may be the same cache instance 212, as shown in FIG. 3.

Figure 3:
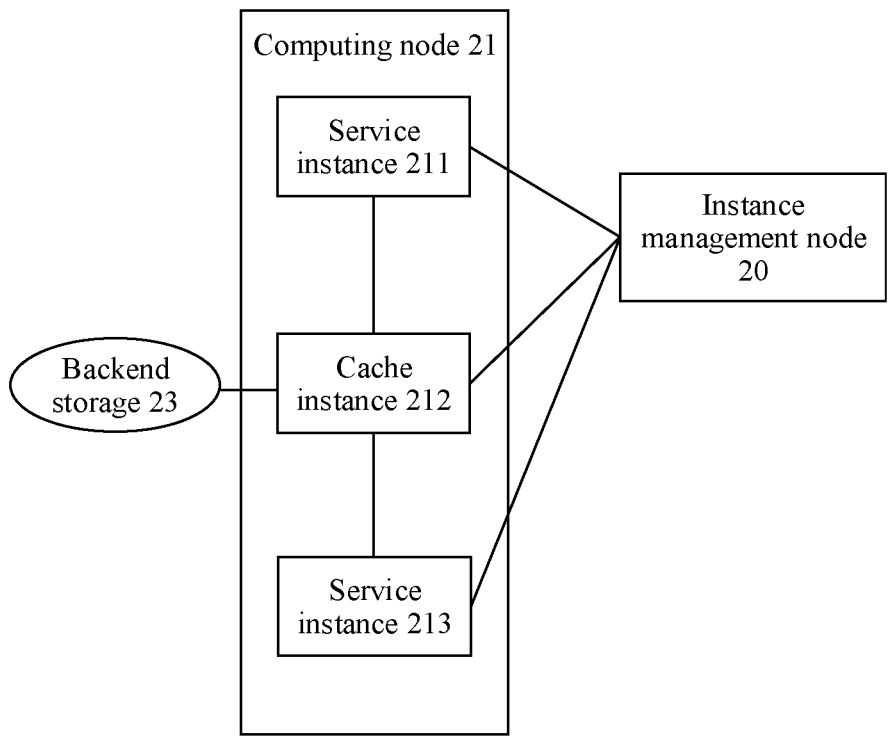
FIG. 3 is a schematic diagram of a scenario to which this disclosure is applicable.
Figure 4:
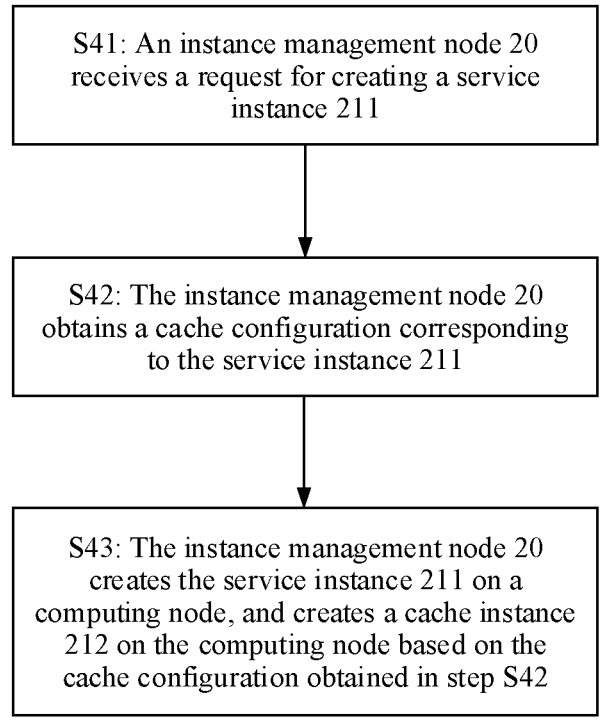
FIG. 4 is a schematic flowchart of an instance deployment method.

The following describes an instance deployment method with reference to FIG. 2, FIG. 3, and FIG. 4. In the method, when a service instance running a specific service is deployed, a matched cache instance is automatically deployed for the service instance. A cache configuration of the cache instance is customized for the service or the service instance. This improves efficiency of providing a service by the service instance, and improves service performance.

Step S41: The instance management node 20 receives a request for creating the service instance 211.

The service instance 211 is a service instance running a specific service.

A scenario of triggering the request of the service instance 211 is not limited. For example, when a tenant needs to deploy the service, the tenant or a user of the tenant sends the request for creating the service instance 211 to the instance management node 20.

Optionally, the request carries a cache configuration of a cache instance used by the service instance 211.

Optionally, the request does not carry a cache configuration of a cache instance used by the service instance 211.

Step S42: The instance management node 20 obtains the cache configuration corresponding to the service instance 211.

The service instance 211 uses the matched cache instance to improve efficiency of providing a service or improve service performance. Specifically, the service or the service instance 211 has a customized cache configuration, and a cache instance created by using the cache configuration is used to provide a cache service for the service instance 211.

Optionally, if the request received in step S41 carries the cache configuration, the instance management node 20 obtains the cache configuration from the request, and may create, based on the cache configuration, the cache instance customized for the service instance 211.

Optionally, if the cache configuration of the cache instance that matches the service instance 211 is pre-stored, the instance management node 20 obtains the stored cache configuration, and may create, based on the cache configuration, the cache instance customized for the service instance 211.

Step S43: The instance management node 20 creates the service instance 211 on the computing node 21, and creates the cache instance 212 on the computing node 21 based on the cache configuration obtained in step S42.

The created cache instance 212 is used by the service instance 211.

Optionally, the instance management node 20 creates the service instance 211 and the cache instance 212 according to an affinity principle. This can ensure that the service instance 211 and the cache instance 212 are created on a same computing node 21.

Optionally, the backend storage 23 stores data for use by the service instance 211, and the cache instance 212 may be created based on the backend storage 23. In this way, the data in the backend storage 23 may be read into the cache instance 212, and subsequently the service instance 211 directly uses the data provided by the cache instance 212, that is, the service instance 211 uses the data in the backend storage 23 by using the cache instance 212.

For example, a data volume is created based on the backend storage 23, and a path of the data volume is stored in the cache instance 212. In this way, the cache instance 212 may obtain data of the backend storage 23 by using the data volume.

Optionally, the instance management node 20 selects one computing node that meets the service instance 211 and the cache instance 212 from a plurality of computing nodes, to create the service instance 211 and the cache instance 212.

For example, the computing node 21 has an SSD, and the computing node 22 does not have an SSD. The instance management node 20 obtains the cache configuration corresponding to the service instance 211 in step S42, and a cache medium specified in the cache configuration is an SSD. Therefore, the instance management node 20 selects the computing node 21 to create the service instance 211 and the cache instance 212, creates, based on the cache configuration obtained in step S42, the cache instance 212 by using the SSD of the computing node 21, and creates the service instance 211 on the computing node 21.

Optionally, the instance management node 20 generates a request in step S43. The request carries the cache configuration corresponding to the service instance 211, and the request is used to indicate the computing node 21 to create the service instance 211 and the cache instance.

Correspondingly, the computing node 21 receives the request sent by the instance management node 20. The computing node 21 creates the service instance 211 specified in the request, and creates, based on the cache configuration corresponding to the service instance 211, the cache instance 212 specified in the request. In this way, the cache instance 212 may be used by the service instance 211. The service instance 211 may provide a service by using the cache instance 212. This improves efficiency of providing a service by the service instance, and improves service performance.

In the instance deployment method provided, a new specific scenario is provided. To be specific, cache instances having different cache configurations are created on a same computing node to be used by service instances running different services. Correspondingly, the method further includes step S44, step S45, and step S46.

Step S44: The instance management node 20 receives a request for creating the service instance 213.

The service instance 213 and the service instance 211 are service instances that provide different services. The service instance 213 and the service instance 211 need to use cache instances having different cache configurations to provide different services.

An implementation of step S44 is similar to an implementation of step S41. Details are not described herein again.

Step S45: The instance management node 20 obtains a cache configuration corresponding to the service instance 213.

The cache configuration corresponding to the service instance 213 and the cache configuration corresponding to the service instance 211 are different. For example, a cache size (for example, 50 megabytes (MB)) required by the cache configuration corresponding to the service instance 213 is different from a cache size (for example, 60 MB) required by the cache configuration corresponding to the service instance 211. For example, a cache algorithm (LRU) required by the cache configuration corresponding to the service instance 213 is different from a cache algorithm (NO REP) required by the cache configuration corresponding to the service instance 211. For example, a cache write policy (WT) required by the cache configuration corresponding to the service instance 213 is different from a cache write policy (WB) required by the cache configuration corresponding to the service instance 211.

An implementation of step S45 is similar to an implementation of step S42. Details are not described herein again.

Step S46: The instance management node 20 creates the service instance 213 on the computing node 21, and creates the cache instance 214 on the computing node 21 based on the cache configuration obtained in step S45.

The cache instance 214 is used by the service instance 213.

An implementation of step S46 is similar to an implementation of step S43. Details are not described herein again.

Optionally, when the computing node 21 meets both a resource requirement of the service instance 213 and a resource requirement of the cache instance 214, the instance management node 20 creates the service instance 213 and the cache instance 214 on the computing node 21. Optionally, the instance management node 20 generates a request in step S46. The request carries the cache configuration corresponding to the service instance 213, and the request is used to indicate the computing node 21 to create the service instance 213 and the cache instance.

Correspondingly, the computing node 21 receives the request sent by the instance management node 20. The computing node 21 creates the service instance 213 specified in the request, and creates, based on the cache configuration corresponding to the service instance 213, the cache instance 214 specified in the request. In this way, the cache instance 214 may be used by the service instance 213. The service instance 213 may provide a service by using the cache instance 214. This improves efficiency of providing a service by the service instance, and improves service performance.

This disclosure further provides an instance management node 20. Specifically, a function of the instance management node 20 may be implemented on a computing device (for example, a server or another device having a computing capability), so that the computing device serves as the instance management node 20.

The instance management node 20 includes function units configured to implement the instance deployment method. A manner of dividing the instance management node 20 into function units is not limited. The following provides an example of function unit division, as shown in FIG. 5.

Figure 5:
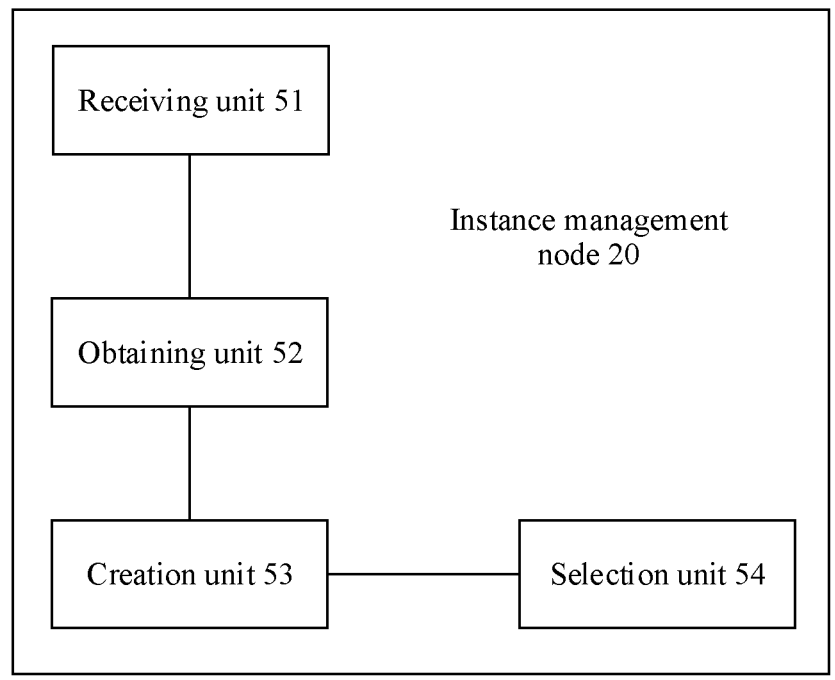
FIG. 5 is a schematic diagram of a logical structure of an instance management node.

The instance management node 20 for instance deployment in FIG. 5 includes: a receiving unit 51 configured to receive a request for creating a first service instance; an obtaining unit 52 configured to obtain a first cache configuration corresponding to the first service instance; and a creation unit 53 configured to: create the first service instance on a computing node, and create a first cache instance on the computing node based on the first cache configuration, where the first cache instance is used by the first service instance.

Optionally, the receiving unit 51 is configured to receive a request for creating a second service instance.

The obtaining unit 52 is configured to obtain a second cache configuration corresponding to the second service instance.

The creation unit 53 is configured to: create the second service instance on the computing node, and create a second cache instance on the computing node based on the second cache configuration, where the second cache instance is used by the second service instance.

Optionally, the first cache configuration includes at least one of the following configurations: a cache size; a cache medium; a cache write policy; and a cache algorithm.

Optionally, the first cache configuration is carried in the request for creating the first service instance.

Optionally, the obtaining unit 52 is configured to obtain the stored first cache configuration based on the first service instance.

Optionally, the instance management node 20 includes: a selection unit 54 configured to select one computing node that meets the first service instance and the first cache instance from a plurality of computing nodes.

Optionally, the first cache instance having the first cache configuration is dedicated to the first service instance.

Optionally, the first service instance may be the service instance 211, the first cache instance may be the service instance 212, the second service instance may be the service instance 213, and the second cache instance may be the service instance 214.

This disclosure further provides a computing node. For example, the computing node is the computing node 21 or the computing node 22. Specifically, a function of the computing node may be implemented on a computing device (for example, a server or another device having a computing capability), so that the computing device serves as the computing node.

The computing node includes function units configured to implement the instance deployment method. A manner of dividing the computing node into function units is not limited. The following provides an example of function unit division, as shown in FIG. 6.

Figure 6:
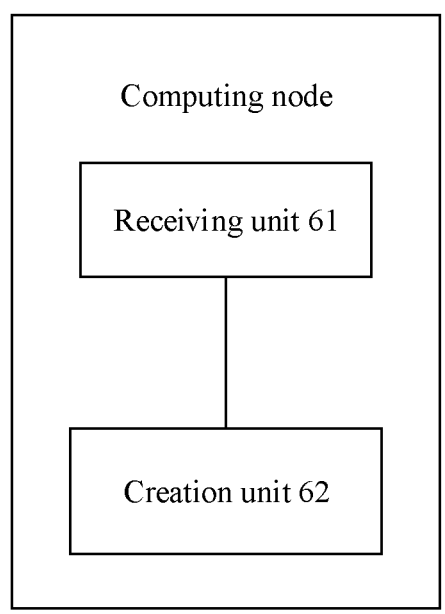
FIG. 6 is a schematic diagram of a logical structure of a computing node.

The computing node for instance deployment in FIG. 6 includes: a receiving unit 61 configured to receive a request sent by an instance management node, where the request carries a first cache configuration; and a creation unit 62 configured to: create a first service instance specified in the request, and create, based on the first cache configuration, a first cache instance specified in the request, where the first cache instance is used by the first service instance.

Optionally, the first cache configuration includes at least one of the following configurations: a cache size; a cache medium; a cache write policy; and a cache algorithm.

Optionally, the first cache instance having the first cache configuration is dedicated to the first service instance.

Optionally, the first service instance may be the service instance 211, the first cache instance may be the service instance 212, the second service instance may be the service instance 213, and the second cache instance may be the service instance 214.

Figure 7:
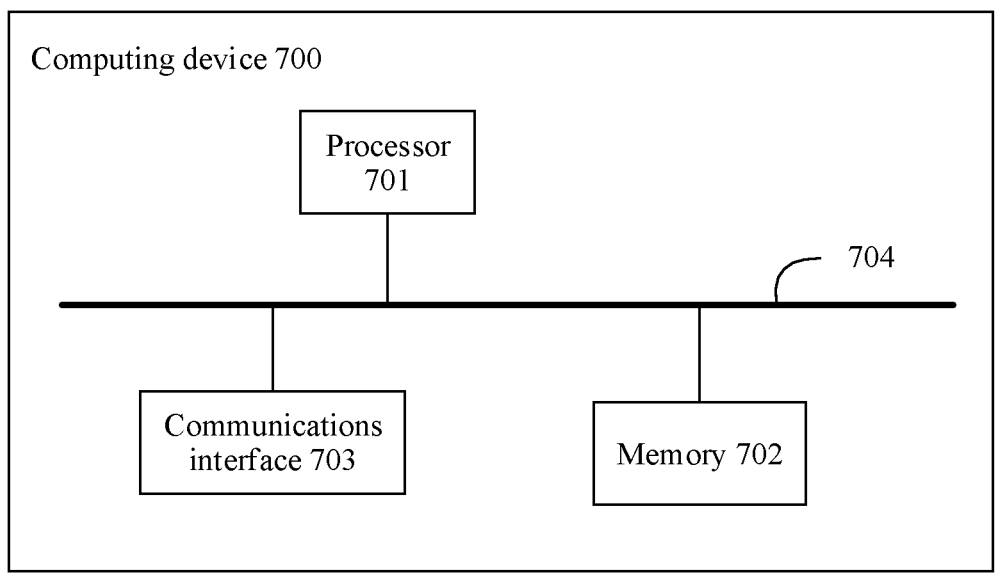
FIG. 7 is a schematic diagram of a structure of a computing device.

Optionally, FIG. 7 schematically provides a possible basic architecture of a computing device.

As shown in FIG. 7, the computing device 700 includes a processor 701, a memory 702, a communications interface 703, and a bus 704.

The computing device 700 may include one or more processors 701. FIG. 7 shows only one processor 701. Optionally, the processor 701 may be a central processing unit (CPU). If the computing device 700 has a plurality of processors 701, the plurality of processors 701 may be of different types or may be of a same type. Optionally, the plurality of processors 701 in the computing device 700 may be further integrated into a multi-core processor.

The memory 702 stores computer instructions and data. The memory 702 may store computer instructions and data required for implementing the instance deployment method provided. For example, the memory 702 stores computer instructions used to implement the steps implemented by the instance management node 20 in the instance deployment method. For example, the memory 702 stores computer instructions used to implement the steps implemented by the computing node in the instance deployment method. For another example, the memory 702 stores computer instructions used to implement the instance management node 20 or the computing node. The memory 702 may be any one or any combination of the following storage media: a nonvolatile memory (for example, a read-only memory (ROM), an SSD, a hard disk drive (HDD), or an optical disc), and a volatile memory.

The communications interface 703 may be any one or any combination of components having a network access function such as a network interface (for example, an Ethernet interface) and a wireless network interface card.

The communications interface 703 is configured to perform data communication between the computing device 700 and another computing device or a terminal.

In FIG. 7, a thick line is used to represent the bus 704. The bus 704 may connect the processor 701 to the memory 702 and the communications interface 703. In this way, through the bus 704, the processor 701 may access the memory 702, and may further exchange data with another computing device or a terminal through the communications interface 703.

The computing device 700 executes the computer instructions in the memory 702, so that the computing device 700 implements the instance deployment method provided, for example, the computing device performs the steps implemented by the instance management node 20 in the instance deployment method, or the computing device performs the steps implemented by the computing node in the instance deployment method. Alternatively, the computing device 700 executes the computer instructions in the memory 702, so that the computing device 700 implements the instance management node 20 or the computing node.

This disclosure provides a computer-readable storage medium. The computer-readable storage medium stores computer instructions. When the processor 701 in the computing device 700 executes the computer instructions, the computing device 700 performs the steps implemented by the instance management node 20 in the instance deployment method provided, or the computing device 700 implements functions of the instance management node 20. Alternatively, when the processor 701 in the computing device 700 executes the computer instructions, the computing device 700 performs the steps implemented by the computing node in the instance deployment method provided, or the computing device implements the computing node provided.

A computer program product includes computer instructions, and the computer instructions are stored in a computer-readable storage medium. The processor 701 in the computing device 700 may read the computer instructions from the computer-readable storage medium, and the processor 701 executes the computer instructions, so that the computing device 700 performs the steps implemented by the instance management node 20 in the instance deployment method, or the computing device 700 implements functions implemented by the instance management node 20. Alternatively, the processor 701 in the computing device 700 may read the computer instructions from the computer-readable storage medium, and the processor 701 executes the computer instructions, so that the computing device 700 performs the steps implemented by the computing node in the instance deployment method provided, or the computing device 700 implements functions implemented by the computing node.

Embodiments are merely intended for describing the technical solutions, but not for limiting the present disclosure. Although the present disclosure is described in detail with reference to embodiments, persons of ordinary skill in the art should understand that they may still make modifications to the technical solutions described in embodiments, without departing from the protection scope of the claims.

What is claimed is:

1. A method comprising:
receiving a request for creating a service instance, wherein the service instance is a first container;
obtaining a cache configuration corresponding to the service instance, wherein the cache configuration comprises a cache size, a cache write policy, a cache algorithm, and a cache medium;
creating the service instance on a first computing node, wherein the service instance is configured to use a cache instance which has the cache configuration, is on a computing node that meets the cache configuration, and is for caching data that are stored in a backend storage and that are for use by the service instance; and
creating, according to the cache configuration and an affinity principle between the service instance and the cache instance, the cache instance on the first computing node for the cache instance to run on the first computing node.

2. The method of claim 1, further comprising selecting, from a plurality of computing nodes, the first computing node based on the first computing node meeting the cache configuration.

3. The method of claim 1, further comprising further obtaining the cache configuration from the request.

4. The method of claim 1, further comprising further creating the cache instance based on the cache configuration and customized for the service instance.

5. The method of claim 1, further comprising obtaining the cache configuration from storage.

6. The method of claim 1, wherein the cache medium is a solid-state drive (SSD).

7. The method of claim 1, further comprising further creating the service instance when the first computing node meets a resource requirement of the service instance.

8. The method of claim 1, further comprising further creating the cache instance when the cache instance meets a resource requirement of the cache instance.

9. A system comprising:
a plurality of computing nodes comprising a first computing node; and
an instance management node configured to:
receive a request for creating a service instance, wherein the service instance is a first container;
obtain a cache configuration corresponding to the service instance, wherein the cache configuration comprises a cache size, a cache write policy, a cache algorithm, and a cache medium;

create the service instance on the first computing node, wherein the service instance is configured to use a cache instance which has the cache configuration, is on a computing node that meets the cache configuration, and is for caching data that are stored in a backend storage and that are for use by the service instance; and create, according to the cache configuration and an affinity principle between the service instance and the cache instance, the cache instance on the first computing node for the cache instance to run on the first computing node.

10. The system of claim 9, wherein the instance management node is further configured to select, from the computing nodes, the first computing node based on the first computing node meeting the cache configuration.

11. An instance management node comprising:
a memory configured to store instructions; and
a processor coupled to the memory and configured to execute the instructions to cause the instance management node to:
receive a request for creating a service instance, wherein the service instance is a first container;
obtain a cache configuration corresponding to the service instance, wherein the cache configuration comprises at least one of a cache size, a cache write policy, a cache algorithm, and a cache medium;
create the service instance on a first computing node, wherein the service instance is configured to use a cache instance which has the cache configuration, is on a computing node that meets the cache configuration, and is for caching data that are stored in a backend storage and that are for use by the service instance; and
create, according to the cache configuration and an affinity principle between the service instance and the cache instance, the cache instance on the first computing node for the cache instance to run on the first computing node.

12. The instance management node of claim 11, wherein the processor is further configured to execute the instructions to cause the instance management node to select, from among a plurality of computing nodes, the first computing node based on the first computing node meeting the cache configuration.

13. The instance management node of claim 11, wherein the processor is implemented by a plurality of processors.

* * * * *